(12) United States Patent
Askan

(10) Patent No.: US 12,537,371 B2
(45) Date of Patent: Jan. 27, 2026

(54) LOW-VOLTAGE PROTECTIVE DEVICE

(71) Applicant: Eaton Intelligent Power Limited, Dublin (IE)

(72) Inventor: Kenan Askan, Vienna (AT)

(73) Assignee: EATON INTELLIGENT POWER LIMITED, Dublin (IE)

( * ) Notice: Subject to any disclaimer, the term of this patent is extended or adjusted under 35 U.S.C. 154(b) by 120 days.

(21) Appl. No.: 18/579,922

(22) PCT Filed: Jul. 20, 2022

(86) PCT No.: PCT/EP2022/025339
§ 371 (c)(1),
(2) Date: Jan. 17, 2024

(87) PCT Pub. No.: WO2023/001406
PCT Pub. Date: Jan. 26, 2023

(65) Prior Publication Data
US 2024/0332945 A1    Oct. 3, 2024

(30) Foreign Application Priority Data

Jul. 22, 2021  (GB) ........................... 2110566

(51) Int. Cl.
*H02H 3/08*    (2006.01)
(52) U.S. Cl.
CPC ..................... *H02H 3/08* (2013.01)
(58) Field of Classification Search
CPC .... H02H 3/08; H02H 3/021; H01H 2009/543; H01H 2009/544; H01H 9/542
See application file for complete search history.

(56) References Cited

U.S. PATENT DOCUMENTS

| | | | |
|---|---|---|---|
| 8,614,868 B2* | 12/2013 | Lawler | H01H 9/547 361/8 |
| 2012/0243137 A1 | 9/2012 | Lawler et al. | |
| 2015/0280421 A1 | 10/2015 | Niwa et al. | |
| 2019/0312423 A1* | 10/2019 | Askan | H01H 9/542 |

FOREIGN PATENT DOCUMENTS

| | | |
|---|---|---|
| DE | 10 2004 024352 A1 | 12/2004 |
| WO | 2015/028634 A1 | 3/2015 |

* cited by examiner

*Primary Examiner* — Crystal L Hammond
*Assistant Examiner* — Samantha L Faubert
(74) *Attorney, Agent, or Firm* — LEYDIG, VOIT & MAYER, LTD.

(57) ABSTRACT

A low-voltage protective device, comprising a first semiconductor circuit arrangement with a power semiconductor, a control and driver unit to drive the first semiconductor circuit arrangement with a control voltage, the control and driver unit configure the first semiconductor circuit arrangement: —in a switching-on process for a switching-on time with a first voltage value, which is a threshold control voltage, of the control voltage, and —increase the control voltage from the first voltage value to a second voltage value, which is a peak control voltage, after the switching-on time, and —increase the control voltage to a third voltage value, which is greater than the peak control voltage, upon detection of a short-circuit current or an overcurrent in a first shut-down step, and to de-energize the first semiconductor circuit arrangement in a second shut-down step.

10 Claims, 2 Drawing Sheets

LOW-VOLTAGE PROTECTIVE DEVICE

The present disclosure relates to a low-voltage protective device according to the generic part of claim 1.

A hybrid low-voltage protective device is known from WO 2015/028634 A1 of the applicant. Thereby, an IGBT/diode circuit is arranged in parallel to a bypass switch. To switch off a current, the bypass switch is opened, thereby causing the current to commutate to the IGBT circuit via the low-voltage protective device. Subsequently, the current is switched off by means of the IGBT circuit.

The IGBT circuit is constantly energized in this case. It is intended that saturation of the IGBT occurs in the event of a short circuit. This is detected by the IGBT driver, and the IGBT is subsequently de-energized.

It has been found that the IGBT circuit in such a low-voltage protective device is heavily loaded, reducing its service life. Since protective devices must function reliably over decades, this is extremely problematic. The desaturation of the collector-emitter voltage when a short-circuit is de-energized leads to a limitation of the maximum current through the IGBT, to a rapid increase in power loss, and can result in thermal overload of the IGBT, which can lead to a total loss of the IGBT. However, to make it possible to reliably de-energize high short-circuit currents, a corresponding concept uses a plurality of IGBTs connected in parallel. Although this solves the problems in terms of current carrying capacity of the overall arrangement, and in terms of thermal overload, it nonetheless results in a much more complex and component-intensive construction. Furthermore, this increases the loop inductance, which in turn increases the commutation time of a current in the event of a short circuit—accordingly creating numerous new problems.

It is an object of the present invention to overcome the drawbacks of the state of the art by providing a low-voltage protective device with which a long lifespan and a low volume or size is achieved.

According to the invention, the aforementioned object is solved by the features of claim 1.

As a result, even high short-circuit currents can be reliably de-energized with only a single power semiconductor component, such as an IGBT or MOSFET, without causing thermal problems or impacting the service life of the low-voltage protective device. Of course, the invention also enables reliably de-energizing overcurrents which are lower than a short-circuit current.

Most AC protective devices cannot be used for DC networks, as DC is a higher problem for switching off than AC. The low-voltage protective device can be used for AC and DC.

In this way, it is possible to reliably prevent a desaturation state of the voltage when an overcurrent or a short-circuit current is switched off. Since no desaturation occurs in the power semiconductor, it can also transmit a correspondingly high current with low power loss. In this case, the lifetime of the power semiconductor is by no means reduced by the excessive increase of the gate voltage relative to the peak gate voltage of the IGBT or MOSFET. The corresponding values of the peak gate voltage are always defined in the data sheets for continuous operation of the respective component. However, since the presently-described increase in the gate voltage only occurs very briefly, and only when an overcurrent or short circuit—which occurs relatively rarely—is de-energized, the power semiconductor is only operated at the overly-high gate voltage for a few milliseconds during a typical 20 to 25 years service life of the low-voltage protective device. This does not reduce the service life of the power semiconductor. The result is that the service life of a low-voltage protective device can be prolonged.

Furthermore, by using only a single power semiconductor component, the conduction paths can be kept short and thus the loop inductance can be kept low, whereby a short-circuit current commutates faster to the power semiconductor. As a result, the time period during which the power semiconductor is loaded can be further reduced, and the service life can be further increased.

It is a further object of the present invention to overcome the drawbacks of the state of the art by providing a method with which a low-voltage protective device is achieved.

According to the invention, said object is solved by the features of claim 9.

The advantages of the method comply with the advantages of the apparatus.

The dependent claims describe further preferred embodiments of the invention.

The invention is described with reference to the drawings. The drawings show only exemplary embodiments of the invention.

Figure 1:
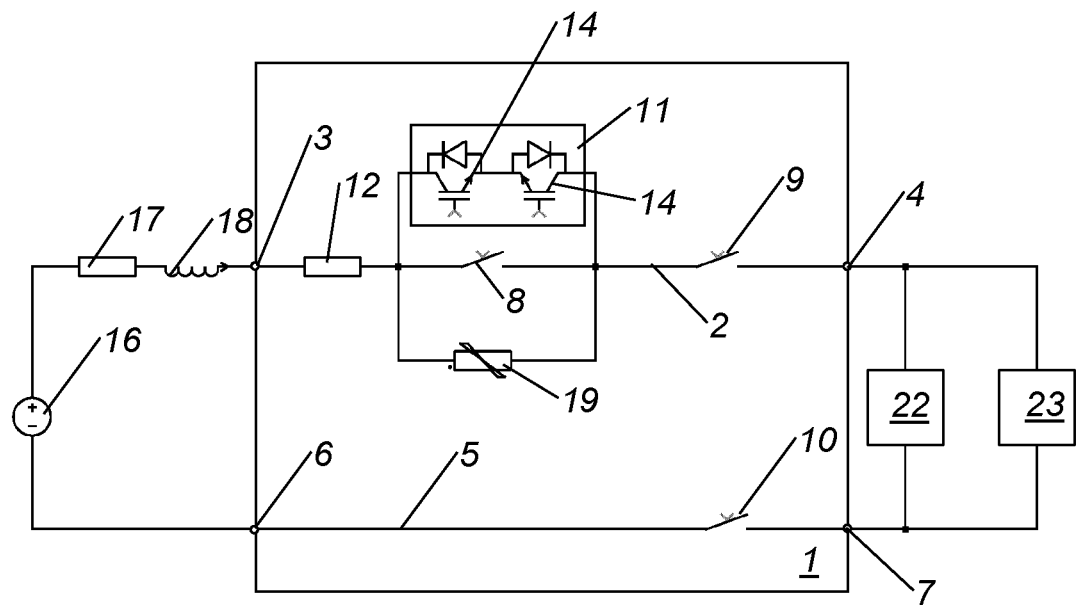
FIG. 1 shows a schematic representation of a low-voltage protective device according to the invention.
Figure 2:
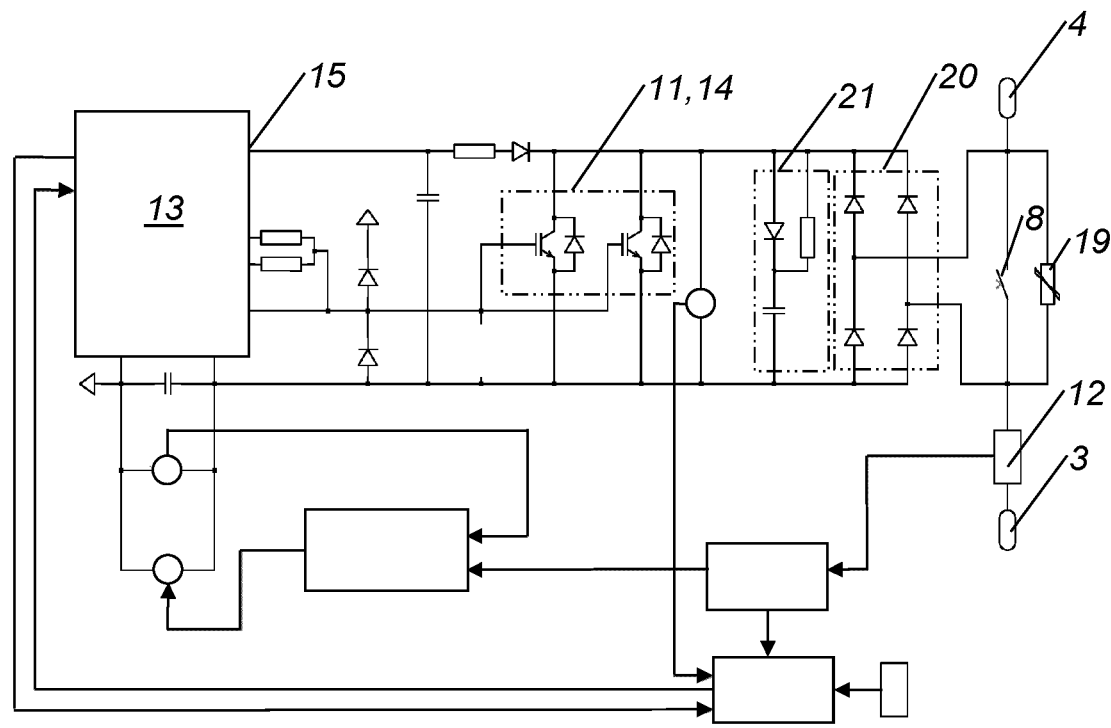
FIG. 2 shows details of a low-voltage protective device according to FIG. 1.
Figure 3:
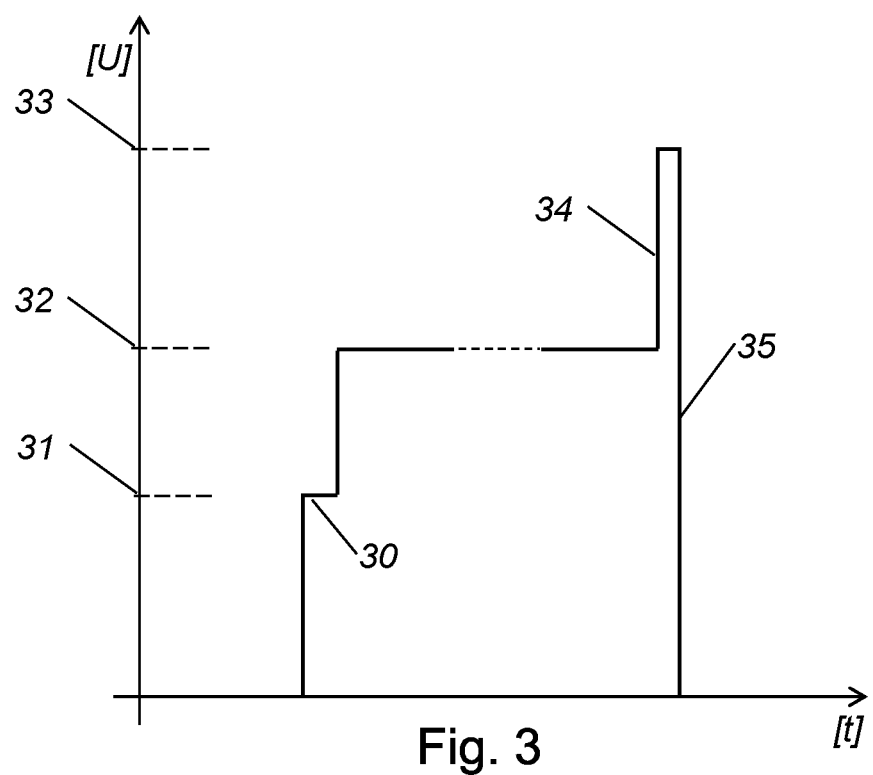
FIG. 3 shows a diagram of the control voltage over time.

FIGS. 1 to 3 illustrate a low-voltage protective device 1, comprising: at least one first outer conductor path 2 from an outer conductor power supply connection 3 of the low-voltage protective device 1 to an outer conductor load connection 4 of the low-voltage protective device 1, a mechanical bypass switch 8 arranged in the outer conductor path 2, a first semiconductor circuit arrangement 11 of the low-voltage protective device 1 connected in parallel to the mechanical bypass switch 8, the first semiconductor circuit arrangement 11 comprising at least one power semiconductor, a control and driver unit 13 configured to drive the first semiconductor circuit arrangement 11 with a control voltage, the control and driver unit 13 being configured to configure the first semiconductor circuit arrangement 11, in a switching-on process of the low-voltage protective device 1, for a switching-on time 30 with a first voltage value 31 of the control voltage, the first voltage value 31 being at least a threshold control voltage of the power semiconductor, and the control and driver unit 13 being configured to increase the control voltage from the first voltage value 31 to a second voltage value 32 after the switching-on time 30, the second voltage value 32 being less than or equal to a peak control voltage of the power semiconductor, and the control and driver unit 13 being further configured to increase the control voltage from the second voltage value 32 to a third voltage value 33 upon detection of a short-circuit current or an overcurrent in a first shut-down step 34, the third voltage value 33 being greater than the peak control voltage of the power semiconductor, and to subsequently de-energize the first semiconductor circuit arrangement 11 in a second shut-down step 35.

It is particularly preferred that the at least one power semiconductor is at least one IGBT 14 or MOSFET, that the control voltage is a gate voltage of the IGBT 14 or MOSFET, and that the peak control voltage is a peak gate voltage of the IGBT 14 or MOSFET. The invention will be described below with reference to these preferred embodiments. However, the use of other power semiconductors—in particular, the use of bipolar transistors—can also be contemplated.

As a result, even high short-circuit currents can be reliably de-energized with only a single power semiconductor component, such as an IGBT 14 or MOSFET, without causing thermal problems or impacting the service life of the low-voltage protective device 1. Of course, the invention also enables reliably de-energizing overcurrents which are lower than a short-circuit current.

Most AC protective devices cannot be used for DC networks, as DC is a higher problem for switching off than AC. The low-voltage protective device 1 can be used for AC and DC.

In this way, it is possible to reliably prevent a desaturation state of the voltage when an overcurrent or a short-circuit current is switched off. Since no desaturation occurs in the power semiconductor, it can also transmit a correspondingly high current with low power loss. In this case, the lifetime of the power semiconductor is by no means reduced by the excessive increase of the gate voltage relative to the peak gate voltage of the IGBT 14 or MOSFET. The corresponding values of the peak gate voltage are always defined in the data sheets for continuous operation of the respective component. However, since the presently-described increase in the gate voltage only occurs very briefly, and only when an overcurrent or short circuit—which occurs relatively rarely—is de-energized, the power semiconductor is only operated at the overly-high gate voltage for a few milliseconds during a typical 20 to 25 year service life of the low-voltage protective device. This does not reduce the service life of the power semiconductor. The result is that the service life of a low-voltage protective device can be prolonged.

Furthermore, by using only a single power semiconductor component, the conduction paths can be kept short and thus the loop inductance can be kept low, whereby a short-circuit current commutates faster to the power semiconductor. As a result, the time period during which the power semiconductor is loaded can be further reduced, and the service life can be further increased.

The present switching device is a low-voltage protective device 1. Low voltage is, as usual, the range up to 1000V AC and/or 1500V.

The low-voltage protective device 1 has at least one outer conductor path 2 and a neutral conductor path 5. For direct current, two conductor paths of different polarity are accordingly provided. The outer conductor path 2 runs through the low-voltage protective device 1 from an outer conductor power supply connection 3 to an outer conductor load connection 4. The neutral conductor path 5 runs through the low-voltage protective device 1 from a neutral connection 6 to a neutral load connection 7. The respective connections 3, 4, 6, 7 are preferably each designed as screw connection terminals and/or plug-in terminals, and are arranged in the low-voltage protective device 1 in a manner allowing access from the outside.

The low-voltage protective device 1 preferably has—at least in sections—housing of insulating material.

A mechanical bypass switch 8 is arranged in the outer conductor path 2.

In the low-voltage protective device 1 as shown, a first mechanical disconnecting switch 9 is furthermore arranged in series with the bypass switch 8 in the outer conductor path 2. A second mechanical disconnecting switch 10 is preferably arranged in the neutral conductor path 5. The two disconnecting switches serve to ensure galvanic isolation.

A semiconductor circuit arrangement 11 is connected in parallel to the bypass switch 8.

The semiconductor circuit arrangement 11 is designed as a four-quadrant switch. In the present case, this is shown with back-to-back IGBTs 14, although the use of other IGBTs 14 or even MOSFETs can be contemplated as well. Accordingly, there is only and/or exactly one IGBT 14 for each half-wave.

The IGBTs 14 and/or MOSFETs are driven by a control and driver unit 13 of the low-voltage protective device 1, which is preferably designed comprising a microcontroller and/or microprocessor.

The control and driver unit 13 is designed to control the bypass switch 8 and the semiconductor circuit arrangement 11, as well as the—preferably provided—first mechanical disconnecting switch 9 and the—preferably provided—second mechanical disconnecting switch 10—and therefore to actuate and/or switch the same in a definable manner. For this purpose, the control and driver unit 13 is connected to the semiconductor circuit arrangement 11, and also to particularly-electromagnetic actuator elements of the first mechanical disconnecting switch 9 and the second mechanical disconnecting switch 10, preferably by circuitry. The control and driver unit 13 is not illustrated in FIG. 1. FIG. 2 shows an expanded context of the control and driver unit 13 in the circuit, wherein not all modules are indicated by reference numerals.

The power semiconductors—in particular, the IGBTs 14—are incorporated into a diode rectifier circuit. In FIG. 1, this is implemented by back-to-back IGBTs. In FIG. 2, this is implemented by a classic diode bridge circuit. This is not necessary if the flowing direction of the electric current is well known and without the possibility of any change.

Furthermore, the low-voltage protective device 1 preferably has a rectifier circuit 20, which is also connected in parallel to the bypass switch 8. This is shown only in FIG. 2. This is only necessary if the electricity is AC. For DC this part is not necessary.

A snubber circuit 21 is likewise shown only in FIG. 2.

Furthermore, an overvoltage arrester and/or varistor 19 is connected in parallel to the bypass switch 8.

The low-voltage protective device 1 further comprises a current measuring arrangement 12 which is arranged in the outer conductor path 2 and which is preferably designed comprising a shunt resistor.

The current measuring arrangement 12 is connected to the control and driver unit 13 of the low-voltage protective device 1.

In addition to the current measuring arrangement 12, the control and driver unit 13 is further designed to detect desaturation of the IGBT 14 or MOSFET. This has already been described in the applicant's WO 2015/028634 A1. For this purpose, the control and driver unit 13 has a correspondingly wired input, which is indicated as the desaturation detection 15. As a result, an overload current or a short-circuit current can also be detected as it arises, and subsequently the low-voltage protective device 1 can be de-energized. This is particularly relevant if the low-voltage protective device 1 will be put into operation under pre-existing overload and/or short-circuit conditions.

In FIG. 1, in addition to the actual low-voltage protective device 1, the electrical context is also indicated. The power grid is illustrated as the grid voltage source 16, the internal line resistance 17, and the grid inductance 18. Furthermore, an electrical load 23 and an electrical fault 22 in the form of a short circuit are shown.

The low-voltage protective device 1 is switched on as principally described in the applicant's WO 2015/028634 A1.

The semiconductor circuit arrangement 11 is energized in a different way by the control and driver unit 13. In the switching-on process of the low-voltage protective device 1 the control and driver unit 13 connect the first semiconductor circuit arrangement 11 with a first voltage value 31 of the control voltage. This first voltage value 31 is at least the threshold control voltage of the power semiconductor. This means the first voltage value 31 is high enough to by at least as high as the threshold control voltage but not much higher. It is not smaller than the threshold control voltage, as this would not case the switching on of the semiconductor circuit arrangement 11. It is not much higher than the threshold control voltage, as this would be a problem in case of a short-circuit current or an overcurrent during the switching on process. In outer words, the first voltage value is high enough the switch on the semiconductor circuit arrangement 11, and as low as possible for this action. Especially the first voltage value 31 is essentially the threshold control voltage of the power semiconductor.

By the preferred use of an IGBT 14 or MOSFET the threshold control voltage of the power semiconductor is a gate threshold voltage of the IGBT 14 or MOSFET. Typically, the gate threshold voltage is between 5V and 7V for an IGBT, and 3V to 4V for a MOSFET. These low voltage values extend the service life of the power semiconductor. Practically and with using an IBGT 14 the first voltage value 31 is typically about 9 V.

The switching-on process needs a switching-on time 30. The control and driver unit 13 provides the first voltage value 31 only during this switching-on time 30. Typically, the switching-on time 30 is between 50 μs and 500 μs, especially 100 μs. The voltage levels during the switching-on process are shown in FIG. 3.

If a short circuit is already present at start-up, this is detected by the desaturation detection 15. Since the current at which the desaturation occurs also decreases as the gate voltage decreases, such a short circuit is detected more quickly than if the semiconductor circuit arrangement 11 is switched on with a high gate voltage. As a result, the short circuit can be detected and de-energized more quickly. It has been shown that, in this case, a short circuit is detected more quickly via the desaturation detection 15 than via the current measuring arrangement 12. After detection of desaturation, the semiconductor circuit arrangement 11 is de-energized directly by the control and driver unit 13, without a prior increase in the control voltage.

After this basic switching-on during a short time and if there is no short circuit or overcurrent, the control and driver unit 13 brings the low-voltage protective device 1 in a setting for a long-time operation stability. For this the control and driver unit 13 increase the control voltage from the first voltage value 31 to a second voltage value 32, typically immediately, after the switching-on time 30. The second voltage value 32 is higher than the first voltage value 31. The second voltage value 32 is further less than or equal to a peak control voltage of the power semiconductor. By the use of an IGBT 14 the second voltage value 32 is typically about 15 V.

To cut out the low-voltage protective device 1 when there is a prevailing current which corresponds at most to the intended operating current, the control and driver unit 13 activates the bypass relay 8 to open the contacts, whereupon the load current commutates completely to the semiconductor circuit arrangement 11.

As soon as the contacts of the bypass relay 8 reach a sufficient gap distance, the semiconductor circuit arrangement 11 is de-energized. For this purpose, there is a first waiting time. It is possible to assume that after this first waiting time, which can be easily determined experimentally, the contacts of the bypass relay 8 have reached the necessary gap distance. The voltage peaks produced by the de-energizing process are reduced in the varistor 19 and/or snubber 21. Subsequently, the disconnecting switches 9, 10 are opened.

Once a short circuit or overcurrent has been detected, the control and driver unit 13 causes the opening of the bypass relay 8 by activating the same accordingly. Simultaneously, in a first shut-down step 34, the control and driver unit 13 increases the gate voltage of the semiconductor circuit arrangement 11 from the second voltage value 32 to a third voltage value 33, the third voltage value 33 being greater than the peak gate voltage of the IGBT 14 or MOSFET. The power semiconductor reacts so quickly in this case that the higher control voltage already prevails before the current commutates.

The third voltage value 33 is preferably between 120% and 170% of the peak control voltage of the power semiconductor. In particular, in the preferred embodiment of the power semiconductor as an IGBT 14 or MOSFET, the third voltage value 33 is preferably between 120% and 170%, in particular between 130% and 160%, of the peak gate voltage of the IGBT 14 or MOSFET. Given a common peak gate voltage of 20V in an IGBT, this corresponds to typical voltages between 24V and 34V.

As described the third voltage value 33 is only used during the shut down of a short circuit or overcurrent. At a low-voltage protective device 1, it would be possible that— during the switching-on process—the first voltage value 31 would be as high as the third voltage value 33 for a very short time. With this way, it would be possible to use power semiconductors to comply with time-current curves.

Power semiconductors are able to cope with such high gate voltages arising during infrequent switching operations. Due to these high gate voltages, desaturation does not occur even at high currents through the IGBT 14 or MOSFET, and the IGBT 14 or MOSFET is operated at saturation.

The opening of the bypass relay 8 and the increase in the gate voltage can substantially occur simultaneously, since the increase of the gate voltage occurs much more quickly than the opening of the bypass relay 8.

After the contacts of the bypass relay 8 have reached a sufficient gap distance, the control and driver unit 13 de-energizes the semiconductor circuit arrangement 11 in a subsequent second shut-down step 35. For this purpose, the control and driver unit 13 preferably waits for a definable and/or previously specified first period of time before it carries out the second shut-down step 35. This makes it possible to ensure that the bypass relay 8 has opened, and the current is fully commutated to the semiconductor circuit arrangement 11 before it is de-energized. The different voltages in the switching off operation are shown in FIG. 3.

The resulting voltage peaks are dissipated via the varistor 19 and/or snubber 21.

The control and driver unit 13 is designed to drive the first semiconductor circuit arrangement 11, in a switching-on process of the low-voltage protective device 1, for the switching-on time 30 with the first voltage value 31 of the control voltage. The first voltage value 31 is at least a threshold control voltage of the power semiconductor. The control and driver unit 13 increase the control voltage from the first voltage value 31 to the second voltage value 32 after the switching-on time 30. The second voltage value 32 is less than or equal to a peak control voltage of the power semiconductor.

The control and driver unit 13 is further designed to carry out the described steps in a corresponding method. In this case, upon detection of a short-circuit current or overcurrent, the control and driver unit 13 increases the gate voltage from the second voltage value 32 to the third voltage value 33 in a first shut-down step 34, wherein the third voltage value 33 is greater than the peak gate voltage of the IGBT 14 or MOSFET, and the control and driver unit 13 de-energizes the semiconductor circuit arrangement 11 in a subsequent second shut-down step 35.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A low-voltage protective device, comprising:
   at least one first outer conductor path from an outer conductor power supply connection of the low-voltage protective device to an outer conductor load connection of the low-voltage protective device;
   a mechanical bypass switch arranged in the outer conductor path;
   a first semiconductor circuit arrangement of the low-voltage protective device connected in parallel to the mechanical bypass switch, the first semiconductor circuit arrangement comprising at least one power semiconductor;
   a control and driver unit configured to drive the first semiconductor circuit arrangement with a control voltage,
   wherein the control and driver unit is configured to configure the first semiconductor circuit arrangement, in a switching-on process of the low-voltage protective device, for a switching-on time with a first voltage value of the control voltage, the first voltage value being at least a threshold control voltage of the power semiconductor,
   wherein the control and driver unit is further configured to increase the control voltage from the first voltage value to a second voltage value after the switching-on time, the second voltage value being less than or equal to a peak control voltage of the power semiconductor, and
   wherein the control and driver unit is further configured to increase the control voltage from the second voltage value to a third voltage value upon detection of a short-circuit current or an overcurrent in a first shut-down step, the third voltage value being greater than the peak control voltage of the power semiconductor, and to subsequently de-energize the first semiconductor circuit arrangement in a second shut-down step.

2. The low-voltage protective device according to claim 1, wherein the at least one power semiconductor comprises at least one IGBT or MOSFET,
   wherein the control voltage is a gate voltage of the IGBT or MOSFET, and
   wherein the peak control voltage is a peak gate voltage of the IGBT or MOSFET.

3. The low-voltage protective device according to claim 1, wherein the first voltage value is essentially the threshold control voltage of the power semiconductor.

4. The low-voltage protective device according to claim 1, wherein the at least one power semiconductor comprises at least one IGBT or MOSFET, and
   wherein the threshold control voltage of the power semiconductor is a gate threshold voltage of the IGBT or MOSFET.

5. The low-voltage protective device according to claim 1, wherein the switching-on time is between 50μs and 500μs.

6. The low-voltage protective device according claim 1, wherein the third voltage value is between 120% and 170% of the peak control voltage of the power semiconductor.

7. The low-voltage protective device according to claim 1, wherein the control and driver unit is configured to detect a desaturation of the power semiconductor, and to de-energize the semiconductor circuit arrangement after detection of desaturation.

8. The low-voltage protective device according to claim 1, wherein the control and driver unit is configured to wait for a definable shut-down period of time between the first shut-down step and the second shut-down step.

9. The low-voltage protective device according to claim 1, wherein the switching-on time is 100μs.

10. A method for operating a low-voltage protective device, the low-voltage protective device comprising: at least one first outer conductor path from an outer conductor power supply connection of the low-voltage protective device to an outer conductor load connection of the low-voltage protective device; a mechanical bypass switch arranged in the outer conductor path; a first semiconductor circuit arrangement of the low-voltage protective device connected in parallel to the mechanical bypass switch, the first semiconductor circuit arrangement comprising at least one power semiconductor; and a control and driver unit configured to drive the first semiconductor circuit arrangement with a control voltage the method comprising:
   the control and driver unit driving the first semiconductor circuit arrangement, in a switching-on process of the low-voltage protective device, for a switching-on time with a first voltage value of the control voltage, the first voltage value being at least a threshold control voltage of the power semiconductor;
   the control and driver unit drive increasing the control voltage from the first voltage value to a second voltage value after the switching-on time, the second voltage value being less than or equal to a peak control voltage of the power semiconductor; and the control and driver unit drive increasing the control voltage from the second voltage value to a third voltage value upon detection of a short-circuit current or an overcurrent in a first shut-down step, the third voltage value being greater than the peak control voltage of the power semiconductor, and the control and driver unit subsequently de-energize the first semiconductor circuit arrangement in a second shut-down step.

* * * * *